United States Patent [19]
Schuster

[11] 3,818,522
[45] June 25, 1974

[54] LAMINAR CUSHION

[75] Inventor: Wilhelm Schuster, Frankfurt am Main, Germany

[73] Assignee: Calottan AG, Basle, Switzerland

[22] Filed: Apr. 12, 1973

[21] Appl. No.: 350,338

[30] Foreign Application Priority Data
Apr. 13, 1972 Germany.......................... 2217759

[52] U.S. Cl...................... 5/347, 5/355, 161/112, 297/453
[51] Int. Cl...................... B32b 33/00, A47c 27/22
[58] Field of Search ... 5/341, 345, 347, 355, 361 R; 297/453, DIG. 3; 161/112, 159, 160

[56] References Cited
UNITED STATES PATENTS

| | | | |
|---|---|---|---|
| 3,323,152 | 6/1967 | Lerman | 5/355 X |
| 3,327,333 | 7/1967 | Jessup | 5/355 |
| 3,335,435 | 11/1967 | Marsh et al. | 5/355 |
| 3,770,560 | 11/1973 | Elder et al. | 161/112 |

*Primary Examiner*—Casmir A. Nunberg
*Attorney, Agent, or Firm*—Kurt Kelman

[57] ABSTRACT

A cushion consisting of three layers of foam plastic or foam rubber separated by double layers of polyolefin foil. The layers of foam material are each formed with a multiplicity of passages extending in the direction of layer thickness, and the passages in each layer are aligned with respective passages in the other two layers. The polyolefin layers provide two integral, pressure-responsive valves in each passage, each valve being formed by a flap bounded in one foil layer by a crescent-shaped cut and normally superimposed on a portion of the other foil layer formed with an opening therein. The cushion breathes when subjected to varying compressive stresses.

8 Claims, 5 Drawing Figures

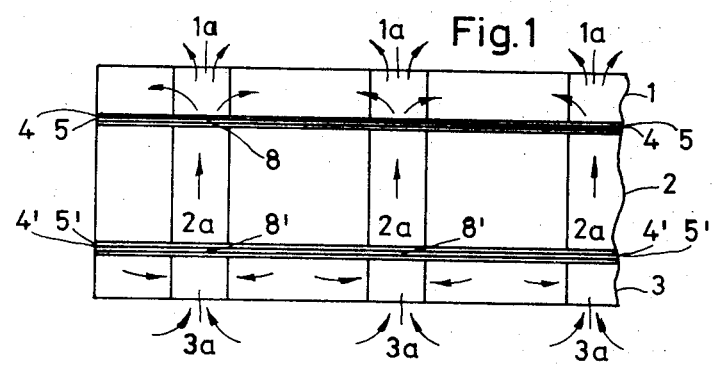
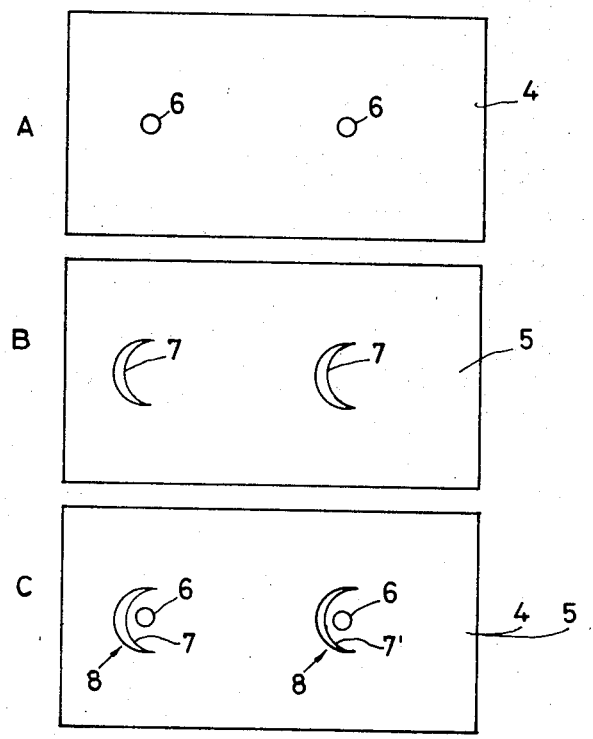

LAMINAR CUSHION

The invention relates to a cushion of foam plastic or foam rubber, and particularly to a cushion suitable for the seats and backs of upholstered chairs and like applications in which the cushion is subjected to varying compressive stress.

Foam rubber, foamed polyurethane, and like foamed elastomers are commonly employed as cushion materials in furniture, also in matresses, and in many other applications including the inner soles of shoes.

It is a common shortcoming of foamed elastomers, even of those having an open cell structure, that their permeability to air, if any, is low, and that cushions made from such material may be uncomfortable to the user, particularly at elevated atmospheric temperature and high humidity.

The primary object of the invention is the provision of a cushion mainly consisting of resilient cellular material and having all the known advantages of such material while being capable of breathing, that is, permitting and actually causing air circulation over its major surfaces under many normal conditions of use.

With this object and others in view, the cushion of the invention is laminar, having at least three layers of resilient cellular material. Each layer has two major faces extending in the direction of length and width of the layer and separated from each other by the thickness of the layer which is substantially smaller that the length or width. The three layers are superposed in the common direction of their thicknesses, whereby the central or core layer forms respective pairs of contiguously juxtaposed layers with the two outer layers. Each layer is formed with a plurality of passages extending therethrough in the direction of layer thickness and aligned with corresponding respective passages in the other two layers. A foil arrangement is interposed between the adjacent major faces of each of the aforementioned pairs for separating the faces and includes a plurality of valves respectively aligned with the aligned passages. The valves are normally closed for separating the adjacent aligned passages and respond to a difference in the fulid pressure in the adjacent passages for connecting the same.

Other features, additional objects, and many of the attendant advantages of this invention will readily be appreciated as the same becomes better understood by reference to the following detailed description of a preferred embodiment when considered in connection with the appended drawing in which FIG. 1 shows a chair cushion of the invention in fragmentary elevational section;

FIG. 2A shows one layer of a foil arrangement in the cushion of FIG. 1 in fragmentary plan view;

FIG. 2B illustrates the other layer of the foil arrangement in the manner of FIG. 2A;

FIG. 2C shows the foil layers of FIGS. 2A and 2B in the assembled condition, in fragmentary plan view.

Figure 3:
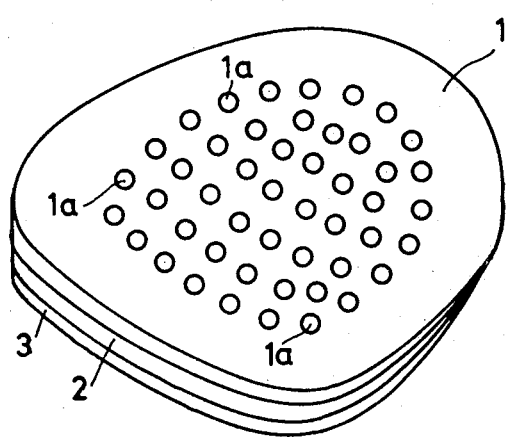
FIG. 3 is a perspective view of the chair cushion on a scale much smaller than that of FIGS. 1 to 2C.

The cushion shown in the drawing consists mainly of three layers 1, 2, 3 of cellular elastomeric material, such as polyurethane foam or foam rubber. The outer layers 1, 3 consist of open-celled material having some permeability to air, while the heavier core layer consists of essentially closed-celled material without significant permeability.

The three layers are perforated in identical patterns. The perforations provide cylindrical, straight passages 1a, 2a, 3a extending through the layers respectively in the direction of their thicknesses which is smaller that the length and width of each layer. In the chair cushion chosen for illustrating the invention, the major faces of the layers are free from passages near their longitudinal edges and the edges extending in the direction of their width, as is best seen for the layer 1 in FIG. 3.

Reverting to FIG. 1, it is seen that each passage 1a in the layer 1 is aligned in the common direction of layer thickness with a passage 2' and a passage 3' in the other two layers respectively. Two directly superimposed foils 4, 5 of flexible polyethylene or polypropylene separate the lower major face of the top foam layer 1 from the adjacent upper major face of the core layer 2, and two polyolefin foils 4', 5' are similarly interposed between the foam layers 2 and 3. The three foam layers and four foil layers are adhesively fastened to each other or may be partly heat sealed to each other in a manner not capable of pictorial representation on the scale of the drawing.

Rectangular portions of the foils 4, 5 are seen in FIGS. 2A and 2B respectively. The foil 4 has a pattern of round punched holes 6 corresponding to the pattern of passages 1a, 2a, 3a, and the foil 5 has crescent-shaped cuts 7 arranged in the same pattern. FIG. 2C illustrates the assembled, practically transparent foils 4, 5. Each cut 7 bounds an approximately semi-circular flap portion 7' of the flexible foil 5, and each flap portion overlies a hole 6 in the assembled foils 4, 5. Each hole 6 and flap 7' jointly constitute a one-way valve 8 which is normally closed, but readily opens when the pressure of an air space communicating with the hole 6 is greater than the air pressure acting on the flap 7'.

The foils 4', 5' interposed between adjacent major faces of the foam layers 2, 3 are respectively identical with the foils 4, 5 and provided with corresponding valves 8'. The pairs of foils are interposed between the foam layers in such a manner that the valves 8, 8' are aligned with respective passages 1', 2', and 3'. The valves 8, 8' are arranged in the illustrated seat cushion in such a manner that they permit air flow through the passages 1a, 2a, 3a in an upward direction only.

A person seated on the cushion and shifting his weight with each movement alternatingly compresses the several portions of the cushion and thereafter permits them to expand again. Air is thereby pumped through the passages 1a, 1b, 1c, and there is concomitant air flow toward the passages 3a in the open-celled layer 3, and away from the passages 1a in the layer 1 if the apertures of the passages in the outer major faces of the cushion are obstructed. Air flow in the closed-cell structure of the layer 2 is limited to the passages 2a.

Air circulation is similarly provided if breathing cushion material of the illustrated type is employed in the back of a seat, in a matress cover or matress, in the innersole of a shoe, and in other applications which will readily suggest themselves.

While the illustrated specific embodiment of the invention is preferred for seat cushions at this time, other laminar arrangement may be chosen without departing from the spirit of the invention. It is possible, for example, to use open-celled foam material in the layer 2 without change in function if the inner walls of the passages 2a are sealed by means of a suitable lacquer coating. The foils 4, 5, 4', 5' are practically impervious to air and thus seal the layer 2 from the layers 1 and 3. The valves 8, 8' act as pressure and suction valves respectively on the variable-capacity pumping space constituted by each sealed passage 2a. The direction of air flow may be reversed in an obvious manner by interchanging the positions of the foils in each pair of foils.

While the illustrated cushion has three foam layers and two pairs of foils, more foam layers may be provided, but it is necessary that there be at least three for producing the desired pumping effect, and it is required that the core layer whose passages serve as expanding and contracting pump spaces be impermeable to the air in the passages thereof. Layers of more rigid material may be interposed between the foam layers to modify the characteristics of the cushion without altering the basic mode of operation.

In the cushion shown in FIG. 3, the foil layers, not themselves visible, are coextensive with the three foam layers in the direction of length and width of the latter. However, larger foils have been used successfully, their edge portions projecting beyond the foam layers and being heat sealed about the core layer.

Other check valves may be substituted for the valves 8, 8' to perform the same function, but the illustrated arrangement combines low cost with good efficiency and is preferred because of its simplicity and cirtually unlimited life.

What is claimed is:
1. A laminar cushion comprising:
   a. three layers of resilient, cellular material,
      1. each layer having two major faces extending in the direction of length and width of said layer and separated from each other by the thickness of said layer, said thickness being substantially smaller that said length and width,
      2. said layers being superposed in the direction of said thickness, thereby forming two pairs of contiguously juxtaposed layers,
      3. each layer being formed with a plurality of passages extending therethrough in the direction of the thickness thereof and being aligned with corresponding respective passages in the other two layers;
   b. foil means interposed between the adjacent major faces of each of said pairs for separating said adjacent faces; and
   c. a plurality of valve means in each of said foil means respectively aligned with said aligned passages, said valve means being normally closed for separating the adjacent aligned passages and responding to a difference in fluid pressure in said adjacent passages for connecting the same.

2. A cushion as set forth in claim 1, wherein each of said foil means includes two directly superimposed foil members of flexible material, respective parts of the superimposed foil members jointly constituting each of said valve means.

3. A cushion as set forth in claim 2, wherein said part of one of said foil members is formed with an opening therethrough, and said part of the other foil member is formed with a cut bounding a flap portion of said other foil member superimposed on said opening in the normal closed condition of said valve means, and responding to said difference by flexing away from said opening.

4. A cushion as set forth in claim 3, wherein said cut is crescent-shaped.

5. A cushion as set forth in claim 3, wherein said two foil members are fixedly fastened to each other.

6. A cushion as set forth in claim 1, wherein each of said valve means includes a check valve permitting flow of air through the aligned passages in one direction only, the two check valves in each set of aligned passages permitting flow in the same direction.

7. A cushion as set forth in claim 6, wherein said three layers include a core layer interposed between the two other layers, said core layer having respective face portions bounding the passage through said core layer, said face portions being impervious to air.

8. A cushion as set forth in claim 7, wherein said foil means are impervious to air, and said material is elastomeric.

* * * * *